Patented July 3, 1923.

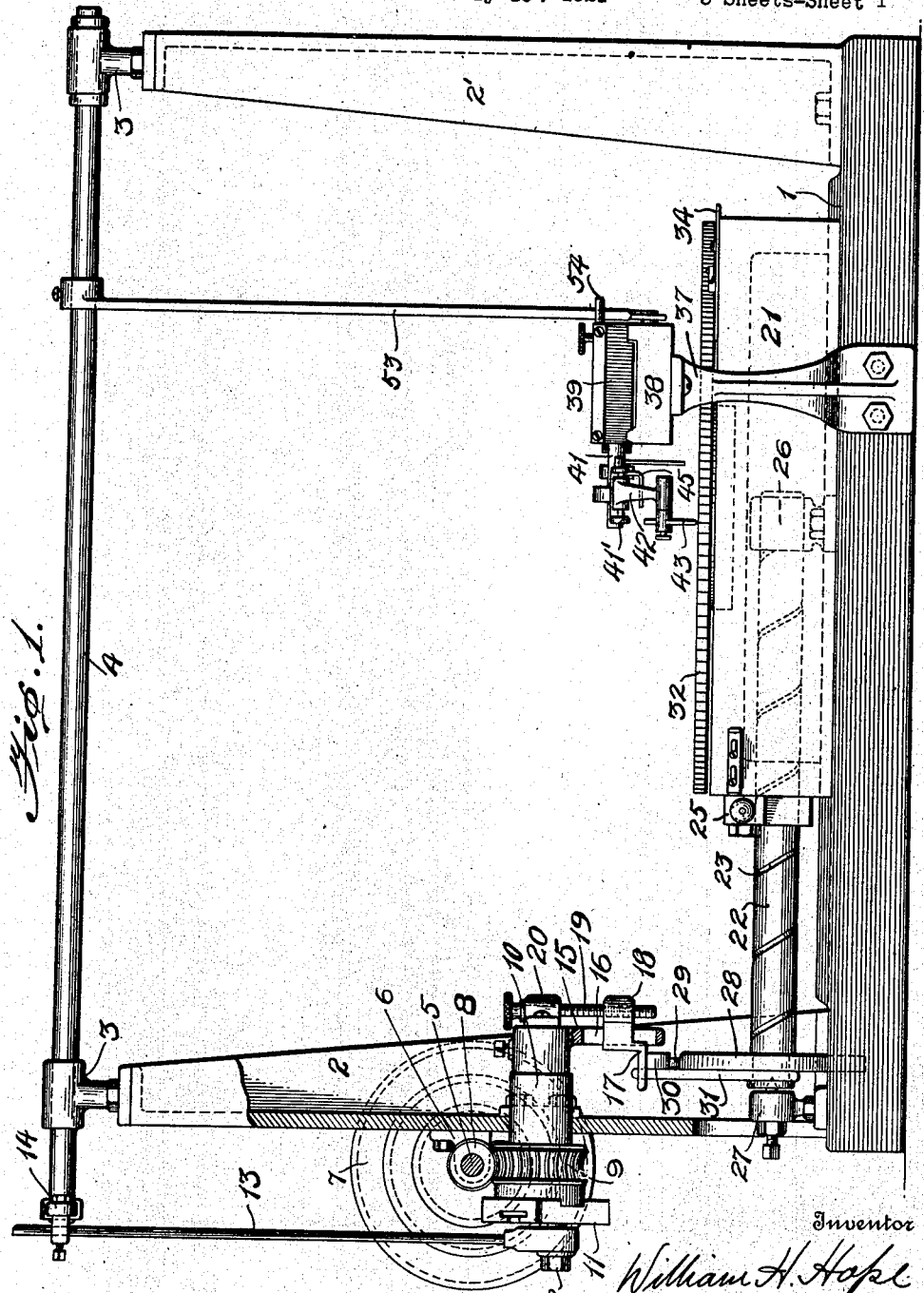

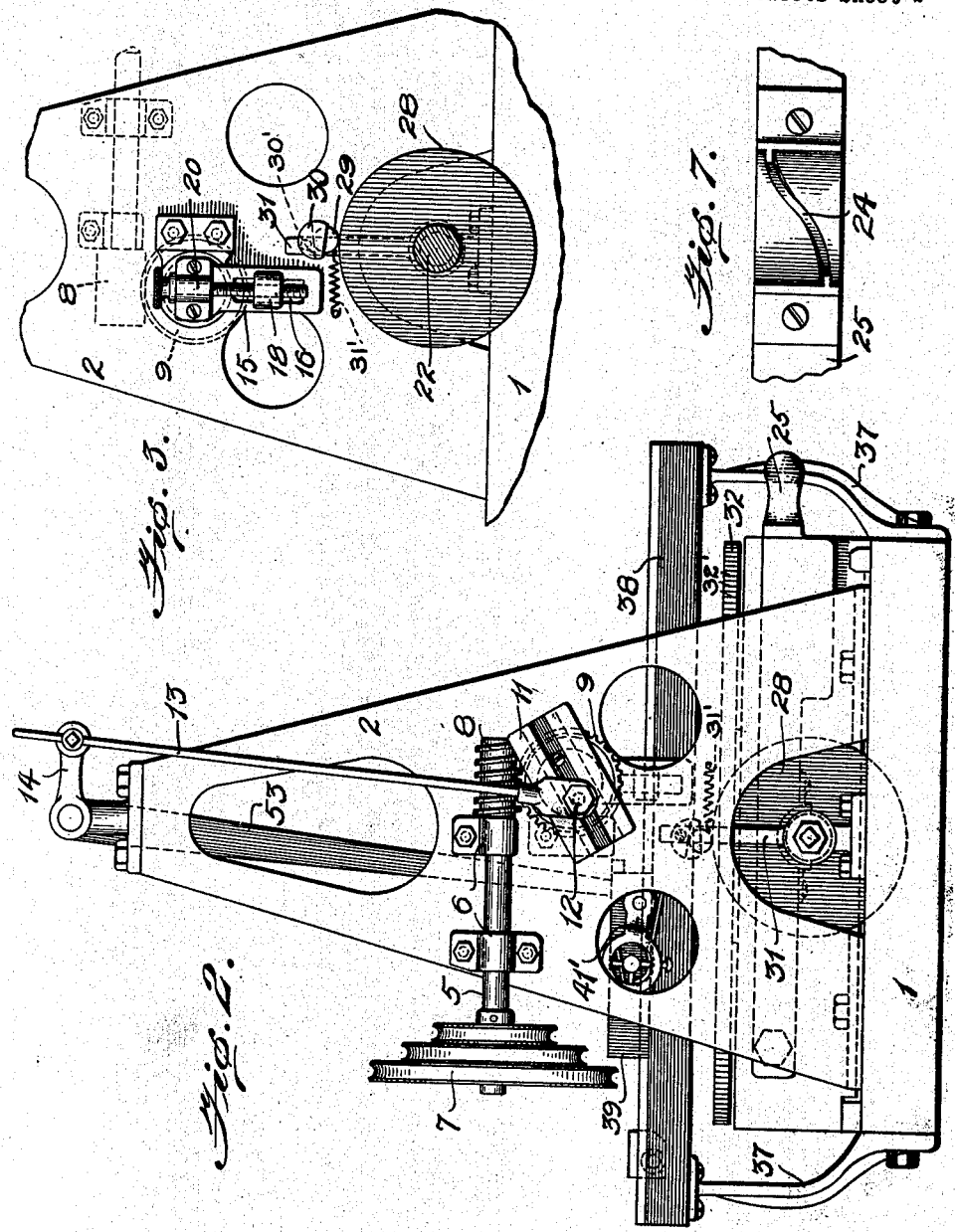

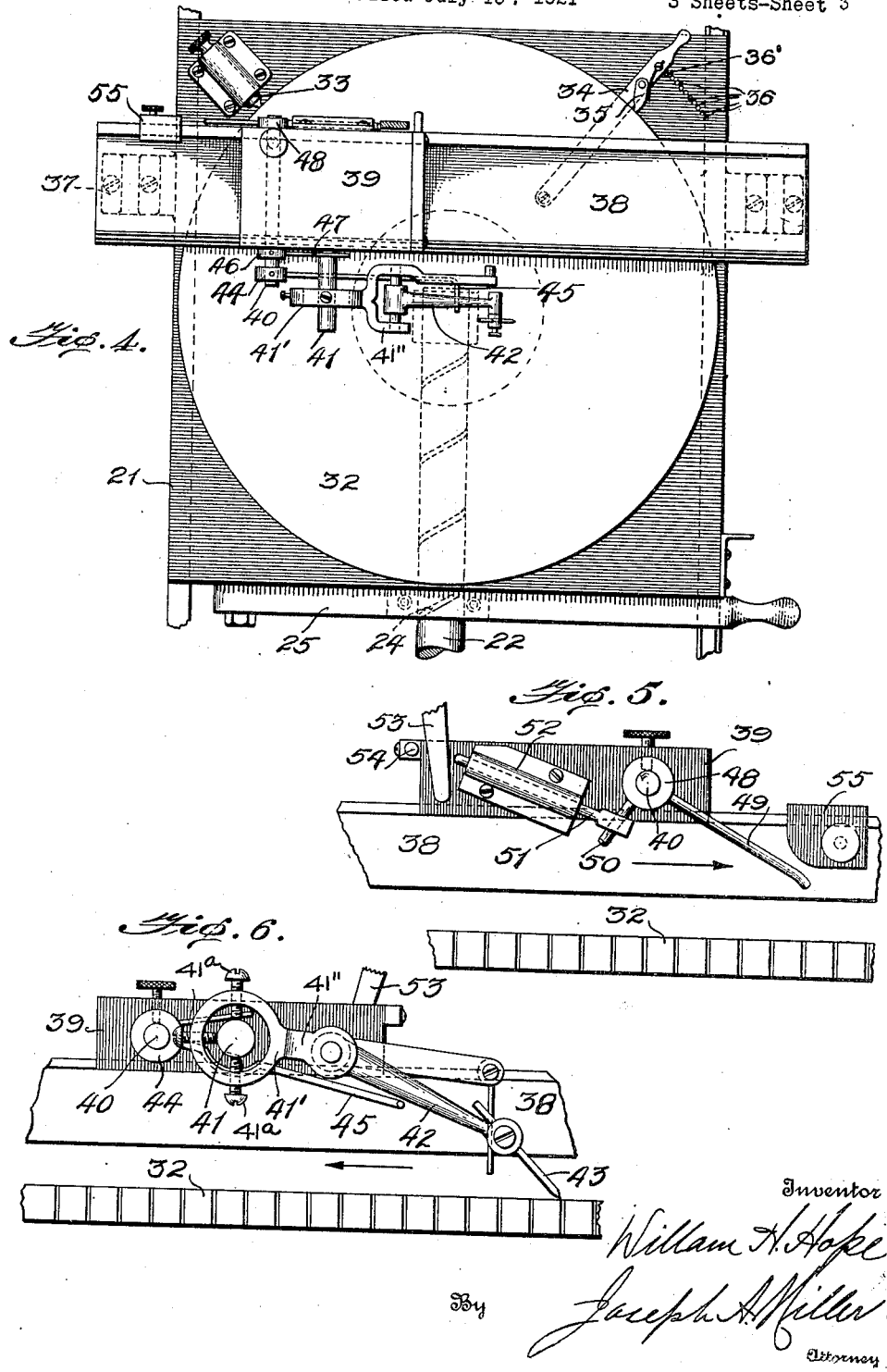

1,461,002

UNITED STATES PATENT OFFICE.

WILLIAM H. HOPE, OF PROVIDENCE, RHODE ISLAND.

RULING MACHINE.

Application filed July 15, 1921. Serial No. 485,124.

*To all whom it may concern:*

Be it known that I, WILLIAM H. HOPE, a citizen of the United States, residing at Providence, in the county of Providence and State of Rhode Island, have invented new and useful Improvements in a Ruling Machine, of which the following is a specification.

This invention relates to certain new and useful improvements in a ruling machine and it has for its primary object to simplify the construction and render the ruling or cutting action automatic throughout.

A further object of the invention is to provide an improved cutter operating mechanism and one which is arranged exteriorly of the space occupied and traversed by the cutter.

Further, the invention resides in an improved feed for the work supporting carriage and also in an improved cutter control mechanism for lifting and lowering the cutter from and to the work support.

The invention will also be found in the features of constructions and the arrangements and combinations of parts hereinafter described and claimed, reference being had to the accompanying drawings, wherein:

Figure 1 is a front elevation of a ruling machine embodying the present invention, a portion of one frame upright being broken away for the sake of clearness;

Figure 2 is an elevation of the left end of the machine;

Figure 3 is a fragmentary transverse section through the machine depicting the clutch feed mechanism for the work carriage;

Figure 4 is a fragmentary plan view of the cutter support and work carriage;

Figures 5 and 6 are elevations of the opposite sides of the sliding carriage which supports the cutter; and Figure 7 is a detailed bottom plan view of the lever for coupling the work carriage to its feed shaft.

Referring more in detail to the drawings the bed 1 of the machine supports two end uprights 2 and 2' each capped by a bearing 3 for journaling the horizontal shaft 4. On the outer face of the upright 2 is a shaft 5 journaled in bearings 6 and equipped at one end with the step pulley 7 and at its opposite end with a worm 8, the latter meshing with a worm gear 9 carried on a shaft 10 which is journaled in and extends through said upright. Fixed to the outer face of worm gear 9 is a slide bar 11 having a T-groove for adjustably receiving a crank pin 12, and on this crank pin is pivoted the lower end of a link or pitman rod 13 which connects said slide bar to a crank arm 14 fixed on the projecting end of shaft 4. On the inner end of shaft 10 is fixed an arm 15 having a radial slot 16 through which projects a finger 17, said finger having a nut portion 18 that cooperates with a screw 19 journaled in a bearing 20, the latter being fixed to the inner end of shaft 10. Obviously, rotation of screw 19 will effect radial adjustment of finger 17.

The work supporting carriage 21 is slidably supported on the bed 1 between the uprights 2 and 2', the same being actuated by means of shaft 22 which has a spiral groove 23 for receiving a correspondingly shaped thread or lug 24 (Fig. 7) carried by lever 25. This thread section or lug 24 may be lifted from the spiral groove 23 when it is desired to have the carriage remain stationary. The screw shaft 22 is journaled in fixed bearings 26 and 27 and fixed on one end of said shaft is a disk 28 the periphery of which is traversed by a clutch roller 29 contained within a housing 30 on the outer end of a lever 31, the latter being freely pivoted on the screw shaft 22 and returned to its normal upright position by means of a spring 31'. The housing 30 is provided with an inclined face 30' between which and the periphery of the disk the roller 29 acts to clutch the lever to the disk in one direction of movement and permit relative rotation in the opposite direction. Consequently, when the arm 16 rotates, its finger 17 will strike against the projecting end of lever 31 and wipe thereover to effect a partial rotation of the lever and disk, and when said lever is released it will be returned to its normal upright position by its spring 31' without reversing the movement of the disk by reason of the idle rolling of the clutch roller over its periphery. In this manner the screw shaft 22 is given an intermittent movement which it transmits to the work carriage 21, said movement being variable upon the radial adjustment of finger 17.

The work carriage is equipped with a rotatable disk 32 having a notched periphery 32' engaged by a resilient lock or friction shoe 33 to yieldably hold the disk against free rotation, and a lever 34 is pivoted to the work carriage and carries a yieldable pawl 35 which engages the periphery of the disk and by means of which said disk may have rotative movements imparted thereto. The extent of such movements is governed by the selective insertion of a stop pin 36' in the series of holes 36 over which the lever 34 moves. For ordinary ruling this disk is not required but where a variation of the ruling is desired, such as cross hatching, the disk may be operated by the hand lever 34 one or more degrees as permitted by the stop pin.

Supported on brackets 37 extending upwardly from the front and rear edges of the bed of the machine, is a bridge or track 38 which overlies the work carriage in spaced relation thereto for slidably supporting the cutter supporting carriage 39. A shaft 40 extends through the carriage 39 and is journaled therein for oscillatory movement and a stud 41 extends laterally from the carriage for adjustably supporting a bracket member 41' which is provided with spaced bearing 41" to pivotally mount the cutter arm 42, and on the free outer end of this arm is adjustably secured the cutter 43 which traverses the work supported on the underlying disk or table 32. The bracket 41' is adjustably secured to the stud 41 by the three screws 41ª. A collar 44 is fixed on the adjacent projecting end of shaft 40 and carries a spring arm 45 which has its free terminal bent to underlie the cutter arm 42 for lifting the cutter from the work when the shaft 40 is rotated in one direction and for lowering the cutter onto the work when the shaft is rotated in the opposite direction. A second collar 46 is fixed on said projecting end of the shaft and carries a spring arm 47 which engages the stud 41 for normally urging the arm 45 to its operative position in which the cutter is elevated from the work.

On the opposite projecting end of shaft 40 is fixed a collar 48 having a rearwardly extending arm or dog 49 inclined downwardly therefrom and a shorter depending arm 50 extending substantially at right angles to arm 49. A push rod 51 is slidably supported in a bearing 52 secured to the side of a carriage 39 and has one end formed to receive the arm 50 and the opposite end projecting into the path of a rocker arm 53 which is fixed to and depends from the shaft 4. A stop pin 54 projects from the cutter supporting carriage for engagement by the arm 53 so that the latter is confined between the stop and the push rod 51.

In operation, power is applied to the pulley 7 for driving the shaft 5 and through the worm gearing 8 and 9 the shaft 10 also. This causes the arm 15 to rotate and upon starting upwardly on each rotation from a position shown in Figure 3 the finger 17 will wipe lever 31 and through clutch 29 effect a partial rotation of the disk 28 and the screw shaft 22. After the finger 17 wipes past the lever 31 the normal tendency of the latter to return to the normal upright position which return movement will free the clutch roller 29 to roll idly over the periphery of the disk 28 without imparting any retrograde movement thereto. Thus, every revolution of the arm 15 will impart a partial rotation to the shaft 22 so that the latter will be rotated in an intermittent or step-by-step manner.

Simultaneous with this intermittent feed of the work, the crank pin 12 and pitman 13 will cause the shaft 4 to be oscillated and as the rocker arm 53 is fixed to this shaft it will be obvious that said arm will cause the carriage 39 to move back and forth across the bridge 38, pushing against the stop 54 in one direction of travel and against the push rod 51 in the opposite direction. When the arm 53 is propelling carriage 39 forwardly, it engages the stop 54 and permits the resilient arm 47 to urge the lift arm 45 upwardly to its normal position in which the cutter will be held elevated above the work during the feed movement of the work. As the carriage moves rearwardly it approaches a trip 55 secured to the bridge 38 in the path of rocker arm 49 which is engaged thereby and is turned downwardly, thereby partially rotating the shaft 40 to act positively on the arm 45 to lift the cutter from the work. The carriage is then returned to its forward position by means of the arm 53 pushing against the stop 54. On its operative or rearward movement the cutter is lowered onto the work by reason of the arm 53 pressing against the push rod 51 thereby rocking the shaft 40 to swing the arm 45 downwardly, or in other words removing its support from the arm 42 and permitting the latter to gravitate to the cutter operating position. The arm 53 exerts a constant pressure against the push rod 51 throughout the operative movement of the carriage 39 at the close of which movement the rocker arm 49 engages the trip 55, pushes the arm 53 outwardly from the guide or bearing 52 and lifts the cutter off the work.

The work carriage travels with an intermittent movement beneath the cutter and in a direction transverse of the path thereof so that a continuous operation of the machine will rule a series of parallel and uniformly spaced lines. Should it be desired to disconnect this work carriage from the screw shaft 22 it is only necessary to lift the thread lug 24 from the groove 23. For the purposes of cross hatching the lever 34 is manipulated to partially rotate the table 32 a distance predetermined by the selective positioning of the stop pin in the holes 36.

It is therefore apparent that the machine will operate automatically in the ruling of parallel lines. To vary the spacing of such parallel lines the finger 17 is adjusted radially by means of the screw 19 to increase or decrease the swing of the lever 31. For varying the length of line to be ruled or the extent of reciprocatory travel of the carriage 39, the crank pin 12 is adjusted radially in the groove of the slide bar 11.

The transmission gearing is arranged exteriorily of the machine frame so that practically the entire space between the end uprights is left open for the operator when attending to the work.

Having thus described my invention, what I claim as new and desire to secure by Letters Patent is:—

1. A ruling machine comprising a bed having end uprights, a shaft journaled on the uprights above the bed, a second shaft journaled on one upright, a slide bar secured to the second shaft, a crank pin adjustable on the slide bar, a rocker arm fixed to the first shaft, a connecting rod between the rocker arm and the crank pin, a work carriage, a cutter carriage, a bridge supporting the latter over the work carriage for movement, a second rocker arm fixed to the first shaft and engaging the cutter carriage for effecting movement thereof, and a cutter carried by the second carriage.

2. A ruling machine comprising a bed having end uprights, a shaft journaled on the uprights above the bed, a second shaft journaled on one upright, a slide bar secured to the second shaft, a crank pin adjustable on the slide bar, a rocker arm fixed to the first shaft, a connecting rod between the rocker arm and the crank pin, a work carriage, a cutter carriage, a bridge supporting the latter over the work carriage for movement, a second rocker arm fixed to the first shaft for reciprocating the cutter carriage, a cutter mounted for movement on the carriage to and from the work carriage, and means operable by the second rocker arm to effect lifting of the cutter from the work carriage.

3. A ruling machine comprising a bed having end uprights, a shaft journaled on the uprights above the bed, a second shaft journaled on one upright, a slide bar secured to the second shaft, a crank pin adjustable on the slide bar, a rocker arm fixed to the first shaft, a connecting rod between the rocker arm and the crank pin, a work carriage, a cutter carriage, a bridge supporting the latter over the work carriage for movement, a second rocker arm fixed to the first shaft for reciprocating the cutter carriage, a shaft journaled in the cutter carriage and projecting at each end therefrom, a pivoted cutter arm on the second carriage, means carried by the shaft on the latter for lifting the cutter arm when said shaft is rotated, and means on the opposite end of the shaft operable by the second rocker arm for rotating the shaft in one direction of movement of the cutter carriage to effect lifting of the cutter arm.

4. A ruling machine comprising a bed having end uprights, a shaft journaled on the uprights above the bed, a second shaft journaled on one upright, means connecting the two shafts for transmitting the rotary movement of the second shaft into oscillatory motion of the first shaft, a crank arm carried by the second shaft and formed with a radial slot, a finger operable in the slot of the arm, a work carriage movably supported on the bed of the machine, a screw shaft for moving the carriage over the bed, a disk fixed on a screw shaft, a lever pivoted on the screw shaft adjacent the disk, a one way clutch carried by the lever and operable to connect the latter to the disk in one direction of movement, said lever being engaged and moved by said finger from its normal position upon rotation of the second shaft, means for returning the lever to normal position, and a cutter operable by the first shaft across the carriage.

5. A ruling machine comprising a bed having end uprights, a shaft journaled on the uprights above the bed, a second shaft journaled on one upright, means connecting the two shafts for transmitting the rotary movement of the second shaft into oscillatory motion of the first shaft, a crank arm carried by the second shaft and formed with a radial slot, a finger operable in the slot, a screw adjustment for the finger for adjusting it radially of the arm, a work carriage movably supported on the bed of the machine, means operable by the finger for moving the carriage, and a cutter operable by the first shaft for movement across the work carriage.

6. In a ruling machine, a movable work support, a cutter carriage reciprocable thereover, a cutter on the carriage, means for rendering the cutter inoperative during movement of the carriage in one direction and operative during reverse movement thereof, and means for moving the work support during the movement of the carriage wherein the cutter is inoperative.

7. In a ruling machine, a carriage, a support therefor, a stud projecting laterally from the carriage, a bracket adjustable on the stud, a cutter-supporting arm pivoted to the bracket, a shaft journaled on the carriage, an arm carried by the shaft for lifting the cutter arm, a dog fixed on the shaft, and a trip arranged in the path of the dog to effect a rocking of the shaft and a lifting of the second arm.

8. In a ruling machine, a carriage, a support therefor, a cutter-supporting arm pivotally mounted on the carriage, means for lifting the arm to an inoperative position, trip-operated means for actuating the first means by and during movement of the carriage, and means for moving the carriage.

9. In a ruling machine, a carriage, a support therefor, a cutter-supporting arm pivotally mounted on the carriage, means for lifting the arm to an inoperative position, trip-operated means for actuating the first means by and during movement of the carriage, means for moving the carriage, and means operable by the last means for rendering the first means inoperative.

10. In a ruling machine, a carriage, a screw shaft for moving the same, and means for imparting an intermittent rotary movement to the shaft including a one-way clutch.

11. In a ruling machine, a carriage, a screw shaft for moving the same, a rotatable lever movable relative to the shaft, means for connecting the lever to the shaft for movement in one direction of rotation, and means for moving the lever in that direction.

12. In a ruling machine, a carriage, a screw shaft for moving the same, a rotatable lever movable relative to the shaft, means for connecting the lever to the shaft for movement in one direction of rotation, and a rotatable arm having a radially adjustable part adapted to wipe the lever to swing the same for effecting rotation of the shaft.

13. In a ruling machine, a movable work support, a cutter carriage reciprocable thereover, a cutter on the carriage, means for rendering the cutter inoperative during movement of the carriage in one direction and operative during reverse movement thereof, means for moving the work support, and means operable only during the inoperative movement of the carriage for rendering said support-moving means operative.

14. In a ruling machine, a work support, a cutter operable thereover, means for moving the support, a rotary actuator for said means, and a finger for wiping the latter, adjustable radially on the actuator to vary the degree of movement imparted to said actuator.

15. In a ruling machine, a carriage, a cutter pivotally mounted thereon, means for reciprocating the carriage, means for rendering the cutter inoperative, and means operable by the first means during one movement of the carriage for rendering the second means inoperative.

16. In a ruling machine, a carriage, a cutter pivotally mounted thereon, means for reciprocating the carriage, and rockable means for lifting the cutter to inoperative position during movement of the carriage in one direction of travel and rendered inoperative by the first means on reverse movement of the carriage.

17. In a ruling machine, a carriage, a cutter pivotally mounted thereon, means for reciprocating the carriage, rockable means mounted to lift the cutter to inoperative position when rocked in one direction and to release the cutter to operative position when rocked in the opposite direction, and means arranged to rock the second means at one limit of travel of the carriage, and said first means acting to reversely rock the second means at the opposite limit of travel.

18. In a ruling machine, a work carriage, means for intermittently moving the same, means for varying the degree of movement, a cutter, a carriage supporting the same for reciprocatory motion over the work carriage, means for lifting the cutter from the work in one direction of travel and lowering it thereto in the reverse direction, and means for actuating the cutter carriage.

19. In a ruling machine, a work carriage, means for intermittently moving the same, means for varying the degree of movement, a cutter, a carriage supporting the same for reciprocatory motion over the work carriage, means for lifting the cutter from the work in one direction of travel and lowering it thereto in the reverse direction, means for varying the extent of travel of the cutter carriage, and means for actuating the cutter carriage.

In testimony whereof I have signed my name to this specification in the presence of two subscribing witnesses.

WILLIAM H. HOPE.

Witnesses:
MARION A. KINGSLEY,
J. A. MILLER.